(12) United States Patent
Kurakado (10) Patent No.: US 8,338,784 B2
(45) Date of Patent: Dec. 25, 2012

(54) RADIATION DETECTOR

(76) Inventor: Masahiko Kurakado, Fuchu (JP)

( * ) Notice: Subject to any disclaimer, the term of this patent is extended or adjusted under 35 U.S.C. 154(b) by 0 days.

(21) Appl. No.: 13/203,721

(22) PCT Filed: Mar. 3, 2010

(86) PCT No.: PCT/JP2010/053394
§ 371 (c)(1),
(2), (4) Date: Apr. 5, 2012

(87) PCT Pub. No.: WO2010/101169
PCT Pub. Date: Sep. 10, 2010

(65) Prior Publication Data
US 2012/0187274 A1 Jul. 26, 2012

(30) Foreign Application Priority Data
Mar. 5, 2009 (JP) .................... 2009-051687

(51) Int. Cl.
*H01L 27/18* (2006.01)
(52) U.S. Cl. .................................. 250/336.2
(58) Field of Classification Search ............. 250/336.1, 250/336.2, 338.1, 390.01
See application file for complete search history.

(56) References Cited

U.S. PATENT DOCUMENTS
5,753,935 A 5/1998 Kurakado et al.

FOREIGN PATENT DOCUMENTS
| JP | H03-274772 A | 12/1991 |
| JP | H08-262144 A | 10/1996 |
| JP | 2005-195552 A | 7/2005 |

OTHER PUBLICATIONS

M. Kurakado, "Possibility of High Resolution Detectors using Superconducting Tunnel Junctions", Nuclear Instruments and Methods, year 1982, pp. 275-277, vol. 196.
Peter K. Day, et al., "A broadband superconducting detector suitable for use in large arrays", Nature, year 2003, pp. 817-821, vol. 425.
B. A. Mazin, et al., "Optical/UV and X-Ray Microwave Kinetic Inductance Strip Detectors", Journal of Low Temperature Physics, year 2008, pp. 537-543, vol. 151.
S. Golwara, et al., "AWIMP Dark Matter Detector Using MKIDs", Journal of Low Temperature Physics, year 2008, pp. 550-556, vol. 151.
M. Daal, et al., "Kinetic Inductance Phonon Sensors for the Cryogenic Dark Matter Search Experiment", Journal of Low Temperature Physics, year 2008, pp. 544-549, vol. 151.
S. M. Sze, Book "Physics of Semiconductor Devices", 2nd Ed., year 1981, pp. 35-38, John Wiley & Sons Inc. Masahiko Kurakado, et al., "Development of superconducting series-junction X-ray detector", FERI Activity report, Mar. 31, 2007, vol. 17, pp. 77-83.
M. Kurakado, et al., "Detection of α particles with a superconducting series-junction detector", Nuclear Instruments and Methods in Physics Research A, 2006, vol. 559, pp. 480-482.

*Primary Examiner* — Mark R Gaworecki (57) ABSTRACT

With radiation detectors in which the energy of radiation is absorbed in a semiconductor or insulator radiation absorber, where that energy is converted to phonons, and the radiation is measured by measuring those phonons with a phonon sensor provided on the surface of the radiation absorber, part of the energy of the radiation is expended in generating electron-hole pairs, and that portion of the energy does not contribute to the signal from the phonon sensor, resulting in low sensitivity and poor energy resolution. A radiation absorber, in which a high concentration of recombination centers is introduced so that electrons and holes excited by radiation recombine in a short time equal to or shorter than a signal extraction time, is used for the radiation detector. Therefore, the energy given to electron-hole pairs is also converted to phonons, thus improving the sensitivity and energy resolution of the radiation detector.

20 Claims, 4 Drawing Sheets

RADIATION DETECTOR

TECHNICAL FIELD

The present invention relates to a radiation detector with superior sensitivity and energy resolution.

BACKGROUND ART

It is well-known that superior energy resolution can be realized with radiation detectors that use superconducting tunnel junctions, as compared with semiconductor radiation detectors using semiconductors. The energy gap of a superconductor is small, on the order of 1/1000th of the energy gap of a semiconductor or less, and is considerably smaller than the maximum phonon energy; therefore, when radiation is absorbed in a superconductor, a 1000-times greater number of electrons than in the case of a semiconductor detector are excited above the energy gap. In a superconducting tunnel junction, the electrons excited above the energy gap can be extracted as signal charge via a tunneling effect. Therefore, a radiation detector using a superconducting tunnel junction can have extremely high sensitivity and high energy resolution (see Non-Patent Literature 1).

However, with a detector of the type in which radiation is directly absorbed in a single superconducting tunnel junction to measure its energy, because the superconducting tunnel junction has a small surface area on the order of several hundred micrometers×several hundred micrometers or less and a thickness on the order of several hundred nanometers, the detection efficiency is extremely low, at one part in several thousand compared with that of a semiconductor detector.

To overcome these drawbacks of radiation detectors using superconducting tunnel junctions, a superconducting series-junction detector has been developed (for example, see Patent Literature 1 and Patent Literature 2). The superconducting series-junction detector is provided with a superconducting series junction in which a large number of superconducting tunnel junctions are connected in series or in parallel on at least one surface of a single-crystal insulator or semiconductor substrate. The superconducting series junction mentioned here includes not only junctions connected in a single series, as in Patent Literature 1, but also includes multiple series junctions connected in parallel. The substrate thickness is, for example, about 400 micrometers. In the superconducting series-junction detector, radiation is absorbed in a radiation absorber, such as the substrate, where the energy thereof is converted to phonons, the phonons are absorbed in the superconducting tunnel junctions formed on the surface of the radiation absorber, exciting electrons in the superconductor, and those excited electrons are extracted as signal charge via the tunneling effect. The energy of the radiation is measured from the magnitude of that signal charge. Because the phonons are absorbed in a large number of superconducting tunnel junctions, the effective area of the detector can be made large. In addition, because the thickness of the radiation absorber is the thickness of the detector, the radiation absorption efficiency can also be increased.

A superconducting tunnel junction is also effective for an optical sensor. When a superconducting series junction is used as an optical sensor, the sensor effective area is large; therefore, in this case too, an advantage is afforded in that the detection efficiency is high. In the present invention, light such as ultraviolet light, visible light, infrared light, which are electromagnetic waves similar to X-rays etc., are also included in the definition of radiation.

With regard to radiation detectors making use of the fact that a large number of electrons are excited in a superconductor by radiation, besides superconducting tunnel junction detectors, for example, kinetic induction detectors (Kinetic Inductance Detector) are also well-known (for example, see Non-Patent Literature 2). Kinetic inductance detectors are also known as microwave kinetic inductance detectors (Microwave Kinetic Inductance Detector). In a kinetic inductance detector, when electrons are excited in a superconducting film of a resonator by radiation, the kinetic inductance of the superconductor resonator changes. The resonance frequency and Q factor of the superconducting resonator change due to this change in the kinetic inductance. The amount of radiation or the energy per individual unit of radiation is measured from the magnitude of the changes in resonance frequency and Q factor (for example, see Non-Patent Literature 3).

In other words, in a kinetic inductance detector and a superconducting tunnel junction detector, although the signal extraction methods are different, what they have in common is that the basis of the signal is excited electrons in the superconductor.

In the case of a kinetic inductance detector, similar to the case of a superconducting series-junction detector, radiation can be absorbed in a semiconductor or insulator single-crystal radiation absorber, where the energy thereof is converted to phonons, these phonons are absorbed in a phonon-absorbing superconducting film provided on the surface of the radiation absorber, exciting electrons, and the radiation can also be detected using changes in the resonance frequency and Q factor of a resonator formed to include this superconducting film (for example, see Non-Patent Literature 4 and Non-Patent Literature 5).

In other words, with the phonon-mediated kinetic inductance detector and the superconducting series-junction detector, although the signal extraction methods differ, what they have in common is that the basis of the signal is excited electrons that are excited in the superconducting film on the substrate surface by phonons generated by radiation absorbed in the substrate. Note that, in the case of the superconducting series junction, the superconducting film on the substrate surface is a superconducting lower electrode of the superconducting tunnel junction.

Figure 1:
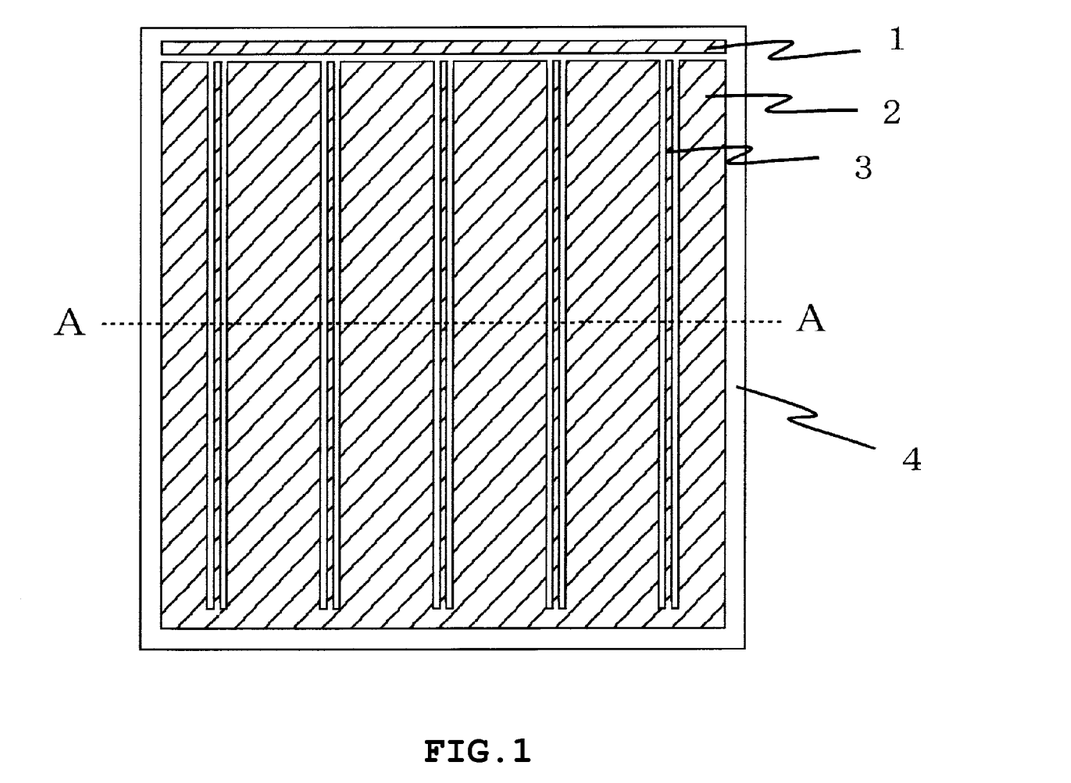
FIG. 1 is a plan view showing a first construction Example of a kinetic inductance detector.
Figure 2:
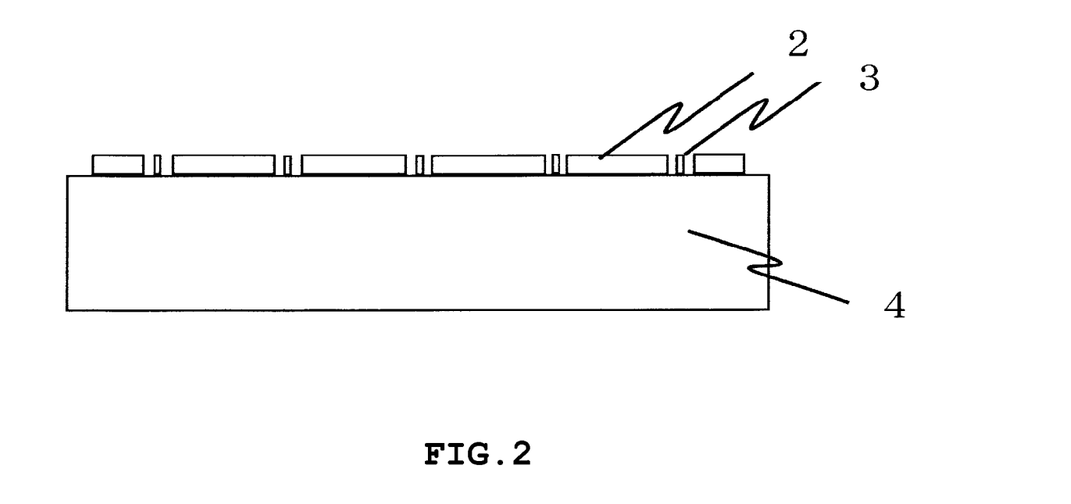
FIG. 2 is a sectional view taken along A-A in FIG. 1.
Figure 3:
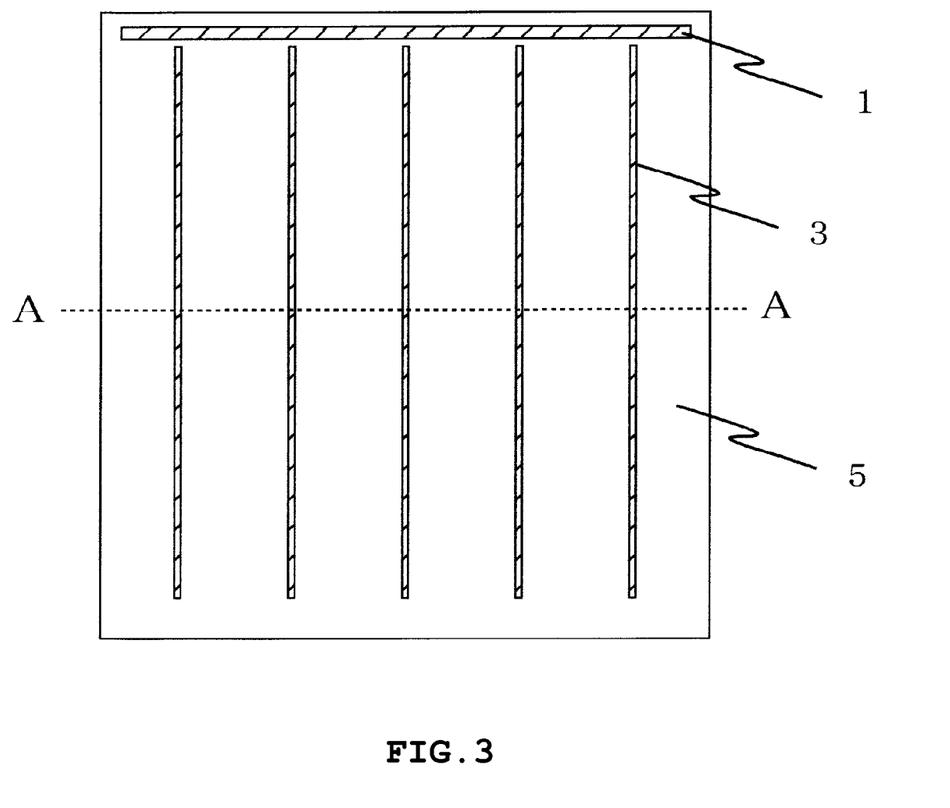
FIG. 3 is a plan view of part of a resonator, showing a first construction Example of the kinetic inductance detector.
Figure 4:
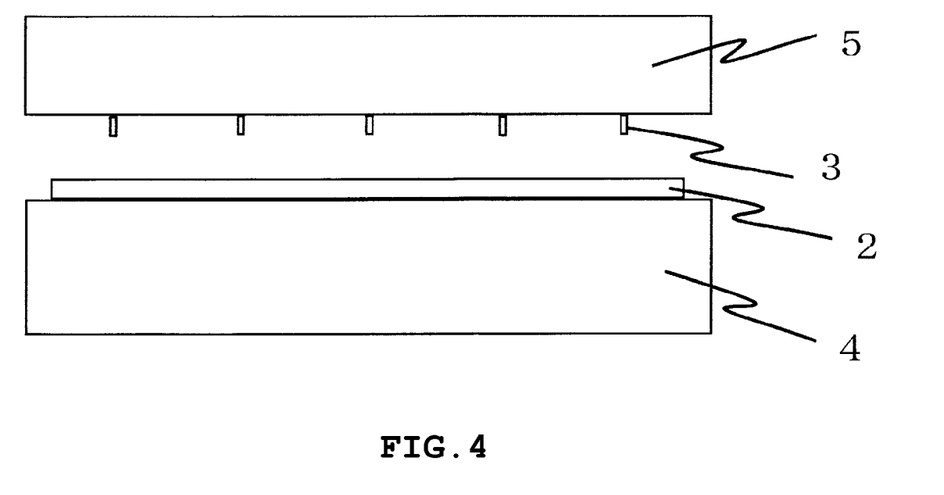
FIG. 4 is a sectional view of the entire detector corresponding to part A-A in FIG. 3.

In the case of the phonon-mediated kinetic inductance detector, it is necessary to provide the superconductor for absorbing phonons on the surface of the radiation absorber substrate; however, with regard to the entire resonator, in some cases the entire resonator is provided on that substrate surface (for example, see Non-Patent Literature 4), and in some cases, some elements of the resonator are provided on another substrate close to that substrate (for example, see Non-Patent Literature 5). FIGS. 1 to 4 show example structures of these kinetic inductance detectors. FIG. 1 and FIG. 2 are an example in which the entire resonator is provided on the surface of the radiation absorber substrate, where FIG. 1 is a plan view, and FIG. 2 is a sectional view taken through part A-A in FIG. 1. FIG. 3 and FIG. 4 are an example in which part of the resonator is provided on another substrate close to the radiation absorber substrate. FIG. 3 is a plan view of the other substrate close to the radiation absorber substrate, and FIG. 4 is a sectional view of the entire resonator, corresponding to part A-A in FIG. 3, including both a radiation absorber substrate 4 and another substrate 5 close to it. 1 represents a through-line formed of a superconducting film for supplying microwaves and measuring the Q factor and resonance frequency, 2 represents a phonon-absorbing superconducting film, and 3 represents a high-Q-factor superconducting resonator line. The through-line 1 and the high-Q-factor superconducting resonator line 3 are capacitively coupled. In addition, in this case also, the phonon sensor 2 is bonded to the surface of the radiation absorber 4.

In the superconducting series-junction detector and the kinetic inductance detector, radiation is absorbed in the radiation absorber, such as a semiconductor or insulator substrate, where the energy thereof is converted to phonons, the phonons are absorbed in the superconducting tunnel junction or phonon-absorbing superconductor formed on the surface of the radiation absorber, exciting electrons in the superconductor, and these excited electrons are extracted as signal charge via the tunneling effect, or a change in the characteristics of the superconducting resonator due to the excited electrons is extracted as a signal. The radiation energy is measured from the magnitude of this signal. However, this does not mean that all of the radiation energy is directly converted to phonons. This can be understood from the principle of a semiconductor detector that does not use phonons. In the case of a semiconductor detector, an electric field is applied to the detector to collect electrons and holes excited by radiation, and the radiation energy is measured from the magnitude of this signal charge. On the other hand, in the case of a radiation detector in which a signal is generated by phonons, such as the superconducting series-junction detector, the electrons and holes in the radiation absorber cannot contribute to the signal charge unless their energy is converted to phonons.

The processing time for the signal from the superconducting series-junction detector and the kinetic inductance detector is normally from several microseconds to several tens of microseconds. Therefore, in the case of these superconducting radiation detectors, the radiation energy expended in generating electrons and holes in the radiation absorber, such as a semiconductor or insulator, by the radiation does not contribute to the signal unless the electrons and holes recombine within the time for extracting and processing the signal, and the energy is thereof is converted to phonons. However, the lifetime of excited electrons in a high-purity silicon substrate, in other words, the electron-hole recombination time, is from several tens of microseconds to 1 millisecond or longer.

In addition, for example, in the case where the radiation absorber is semiconductor silicon and where the radiation is X-rays, it is well-known that about 30% of the X-ray energy is imparted to electrons, and the remaining about 70% is expended in generating phonons. However, this energy distribution ratio statistically fluctuates for each unit of radiation even though the radiation energy is constant, and this statistical fluctuation degrades the energy resolution.

Unless the excitation energy possessed by electrons excited by radiation such as X-rays and light is released in the form of phonons within the signal measurement time, there is a problem in that, not only does the energy resolution of these detectors deteriorate, but also the sensitivity is reduced by a corresponding amount.

CITATION LIST

Patent Literature

Patent Literature 1: Japanese Unexamined Patent Application, Publication No. HEI 3-274772
Patent Literature 2: Japanese Unexamined Patent Application, Publication No. HEI 8-262144

Non-Patent Literature

Non-Patent Literature 1: Nuclear Instruments and Methods, 196 (1982) 275-277
Non-Patent Literature 2: Nature 425 (2003) 817-821
Non-Patent Literature 3: Journal of Low Temperature Physics 151 (2008) 537-543
Non-Patent Literature 4: Journal of Low Temperature Physics 151 (2008) 550-556
Non-Patent Literature 5: Journal of Low Temperature Physics 151 (2008) 544-549
Non-Patent Literature 6: S. M. Sze, Physics of Semiconductor Devices, 2nd Ed., pp. 35-38, 1981 (John Wiley & Sons, Inc)

DISCLOSURE OF INVENTION

Technical Problem

As described above, the radiation energy is absorbed in a semiconductor or insulator, where the energy thereof is converted to phonons, and these phonons are measured with a phonon sensor provided on the surface thereof, and thereby part of the radiation energy is expended in generating electrons and holes in the radiation sensor which measures the radiation, and that portion of the energy does not contribute to the signal from the phonon sensor. Therefore, such radiation detectors suffer from the problem that the sensitivity with respect to X-rays etc. is low, and the energy resolution is deteriorated. Furthermore, in measuring light intensity, etc., they suffer from the problem that the sensitivity is low, and in addition, that the response speed is slow because the energy conversion from electron-hole pairs to phonons is slow.

The present invention is directed to a superconducting series-junction detector, a kinetic inductance detector, etc. in which a single-crystal semiconductor or insulator is used as a radiation absorber, and an object thereof is to reduce the deterioration in sensitivity and energy resolution, as well as the reduction in response speed, caused by the radiation energy being distributed to electron-hole pairs in the radiation absorber, thus improving the sensitivity and energy resolution, as well as the response speed.

Solution to Problem

In order to achieve the above-described object, the invention of the present application uses a radiation absorber in which a sufficient concentration of recombination centers are introduced so that electrons and holes excited by radiation recombine within a time equal to or shorter than a signal extraction time, as a radiation absorber in a superconducting series-junction detector, phonon-mediated kinetic inductance detector, or the like.

Impurities or crystal defects other than impurities may be used as the recombination centers. The term radiation as used here means X-rays, gamma rays, charged particles, light etc. Also, in the present patent application, the radiation absorber absorbs this radiation and converts the energy thereof to phonons.

Effects of the Invention

By introducing electron-hole recombination centers into the radiation absorber, energy expended in generating electrons and holes in the radiation absorber is rapidly converted to phonons, which contribute to the signal from the superconducting tunnel junction, kinetic inductance detector, or the like, thus improving the sensitivity and energy resolution of the detector, as well as the response speed.

MODE(S) FOR CARRYING OUT THE INVENTION

With either a superconducting series-junction detector or a phonon-mediated kinetic inductance detector, for a phonon to break Cooper pairs in a superconductor, the phonon must possess an energy larger than the size of the energy gap of the superconductor, that is to say, larger than the binding energy of the Cooper pair.

In the invention of the present application, the radiation absorber is preferably formed of a single-crystal insulator or semiconductor. The reason for this is because, if the radiation absorber is not a single crystal, the energy in the radiation absorber tends to decrease due to phonon scattering at grain boundaries etc., and the signal charge extracted from a superconducting series-junction detector is considerably lower than in the case where a single-crystal radiation absorber is used.

The recombination centers are impurities or crystal defects where electrons and holes readily recombine. Among them, those that have a large recombination effect are known as lifetime killers.

One method of introducing crystal defect recombination centers is a method of irradiating a semiconductor with radiation (electron beam, proton beam, helium particles, other charged particles, gamma rays, neutrons etc.). It is well-known that it is possible to form recombination centers at deep levels also using irradiation with radiation (for example, see Non-Patent Literature 6).

In addition, although impurities contained in the insulator or semiconductor generally serve as recombination centers, an impurity forming a shallow impurity level normally used as the dopant in a semiconductor has comparatively small effectiveness as a recombination center. In a semiconductor or insulator, those impurities forming impurity levels at deep energy levels close to the center of the energy gap are highly effective for the recombination of electrons and holes.

In the invention of the present application, among impurities serving as recombination centers, impurities forming deep impurity levels are preferred as recombination centers. The reason is that, if the effect on recombination per atom of the impurity atoms is small, to increase the recombination efficiency, many impurity atoms must be introduced; however, if many impurities are introduced into a single-crystal radiation absorber, the phonon energy tends to decrease due to scattering thereat, and as a result the signal charge becomes small.

For deep impurity levels, if the valence band edge at the lower limit of the energy region of the energy gap is defined as 0% and the conduction band edge at the upper limit is defined as 100%, levels formed in the 20% to 80% energy region are preferred in order to increase the recombination effectiveness. In other words, impurity elements that form energy levels in the 60% energy region at the center of the energy gap are preferred. For example, if the radiation absorber is single-crystal silicon semiconductor, the donors P, As, and Sb or the acceptors B, Al, Ga etc., which are normally used as the dopants for silicon, form shallow impurity levels and do not form at least the main impurity levels in the 20% to 80% energy region.

In addition, in the case of single-crystal silicon semiconductor, Tl, Pb, Ti, C, Na, Mg, Be, Se, Cr, Ta, Cs, Ba, S, Mn, μg, Cd, Pt, Zn, Au, Co, V, Ni, Mo, Hg, Sr, Ge, Cu, K, Sn, W, Pb, O, Fe, etc. may also be used as impurity elements for forming deep energy levels in the 20% to 80% region of the energy gap.

In the case of single-crystal germanium semiconductor, the donors Li, Sb, P, and As and the acceptors B, Al, Tl, Ga, In, Be, etc. can be used as impurity elements forming shallow levels, and S, Se, Te, Zn, Cr, Cd, Hg, Co, Ni, Mn, Fe, Pt, Cu, Au, Ag etc. can be used as impurity elements forming deep levels.

What is important here is that normally the impurity that is intentionally doped to activate the semiconductor is an element that forms a shallow impurity level. In other words, these dopant impurities that normally form shallow levels can be easily distinguished from impurities that serve as recombination centers or lifetime killers at deep energy levels.

Although the energy gap of an insulator is larger than the energy gap of a semiconductor, apart from this point, an insulator is almost identical to a semiconductor; in particular, at extreme low temperature, where the superconducting series-junction detector or kinetic inductance detector of the invention of the present application is used, the energy gap of a semiconductor is also sufficiently large compared with the thermal energy. Therefore, in the present patent application, an insulator, such as sapphire etc., is treated as being functionally equivalent to a semiconductor such as silicon.

As for the method of introducing an impurity into a single-crystal radiation absorber, an introduction method normally used for semiconductor devices is acceptable. This introduction method may be a method involving mixing an impurity into a base material that is melted when fabricating a single crystal by the melt method etc.; a method involving adding an impurity to a melted base material; a method involving thermal diffusion of an impurity from the surface after fabrication of a single crystal, ion injection of an impurity into a single crystal, or ion injection into a single crystal followed by post-injection thermal diffusion; and so forth.

For example, when the radiation is a heavy ion with small penetrating force, if the thickness of the radiation absorber is larger than the length by which the radiation to be measured penetrates into the radiation absorber, recombination centers do not necessarily need not be introduced uniformly into the entire radiation absorber; a large effect is achieved just by introducing the recombination centers in a region roughly corresponding to the length by which the radiation penetrates into the radiation absorber from the surface at the side where the radiation is incident. Therefore, in the invention of the present application, it suffices that the recombination centers are introduced with sufficient density in part of the radiation absorber. In other words, what is minimally required is not necessarily that the density of recombination centers in the entire radiation absorber should be high, but that the density should be sufficiently high at places in the radiation absorber where the density of recombination centers is highest.

Superconducting series-junction detectors include a detector in which one superconducting series junction is provided on the surface of one radiation absorber (Patent Literature 1) and a detector in which a plurality of superconducting series junctions are provided on the surface of one radiation absorber, so that signals can be independently extracted from the respective superconducting series junctions (Patent Literature 2); however, in the present patent application, either type of superconducting series-junction is acceptable.

Naturally, it is also possible to detect radiation via phonons coming from the substrate by using a superconducting single junction formed of one superconducting tunnel junction. It is apparent from the function of the electron-hole recombination centers in the application of the present invention that the phonon sensor of the invention of the present application may be, for example, one or a plurality of superconducting single junctions provided on such a detector. Furthermore, in the kinetic inductance detectors shown in FIGS. 1 and 2 or FIGS. 3 and 4, it is also clear that the invention of the present application encompasses a detector in which electron-hole recombination centers are introduced into a radiation absorber single-crystal substrate 4.

In the related art, there are semiconductor optical sensors, etc. in which recombination centers are introduced to increase the speed; in such cases, however, high speed is achieved by rapidly recombining excited electrons serving as the signal, causing their annihilation. Therefore, although these detector elements achieve high speed, the signal amplitude is smaller than devices in which recombination centers are not introduced, and the sensitivity is decreased. In addition, when recombination centers are introduced into semiconductor detectors, because the excited electrons serving as the signal are annihilated, and the amount of these annihilated excited electrons varies statistically for each unit of radiation, the energy resolution of the radiation deteriorates compared with when recombination centers are not introduced.

On the other hand, with a superconducting series-junction detector or kinetic inductance detector in which an insulator or semiconductor having recombination centers introduced therein is used as a radiation absorber, the principle of signal generation differs from that in a semiconductor radiation detector or optical sensor: phonons released when electrons and holes recombine at high speed contribute to the signal. Therefore, the signal is large due to electron-hole recombination, and in addition, the sensitivity is also increased.

It is well-known that gold (Au) in silicon is a lifetime killer serving as an electron-hole recombination center; even in the case of gold, to achieve a recombination time of 20 µs, an impurity concentration of about $1\times10^{12}/cm^3$ is required, and therefore, a recombination center concentration from $1\times10^{12}/cm^3$ or more to $1\times10^{21}/cm^3$ or less is generally considered to be necessary (for example, see Non-Patent Literature 6). The reason why $1\times10^{21}/cm^3$ or less is assumed is because, if the concentration of impurities or crystal defects is too high, the energy of the phonons tends to decay during their propagation in the substrate. Of course, it is more preferable that the recombination time be sufficiently shorter than the signal measurement time; for example, for 2 µs or less, a more preferable concentration of impurities acting as recombination centers is from $1\times10^{13}/cm^3$ or more to $1\times10^{20}/cm^3$ or less. In addition, in the case of recombination centers forming deep levels, even for recombination centers that are not as efficient as gold, to achieve a recombination time of 0.1 µs or less, a recombination center concentration of $5\times10^{16}/cm^3$ is considered to be sufficient.

In the case of superconductor radiation detectors, many have radiation absorbers with a flat-plate-shaped substrate; however, other shapes are of course also possible.

Figure 5:
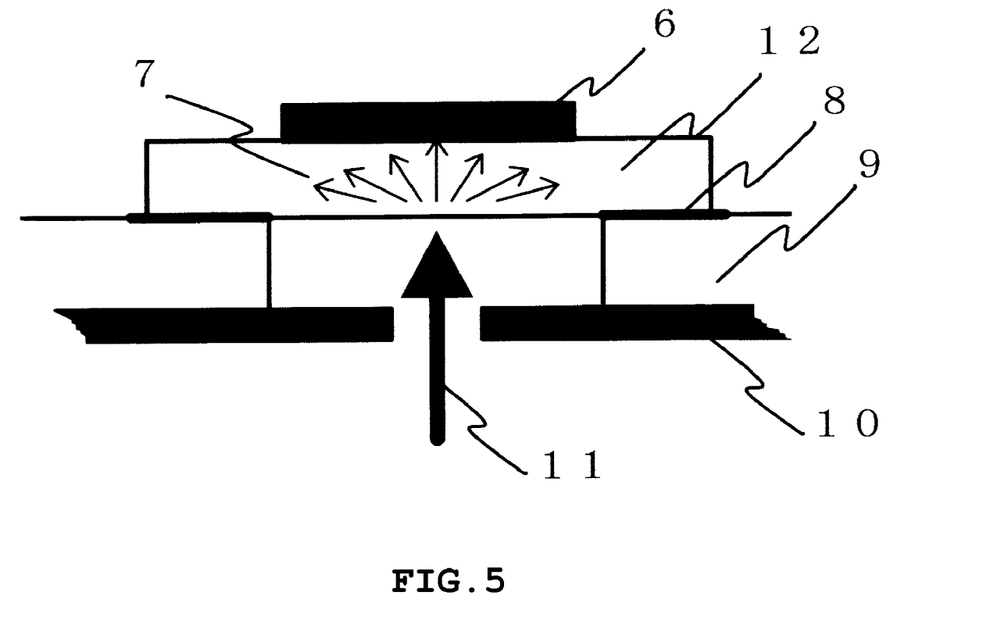
FIG. 5 is a sectional view showing a first Example of a phonon-mediated radiation detector of the invention of the present application.

In FIG. 5, which is a sectional view of a first embodiment of the present invention, 6 represents a phonon sensor such as a superconducting series junction or kinetic inductance detector, 12 represents a single-crystal silicon substrate in which recombination centers are introduced, and 11 represents radiation.

Figure 6:
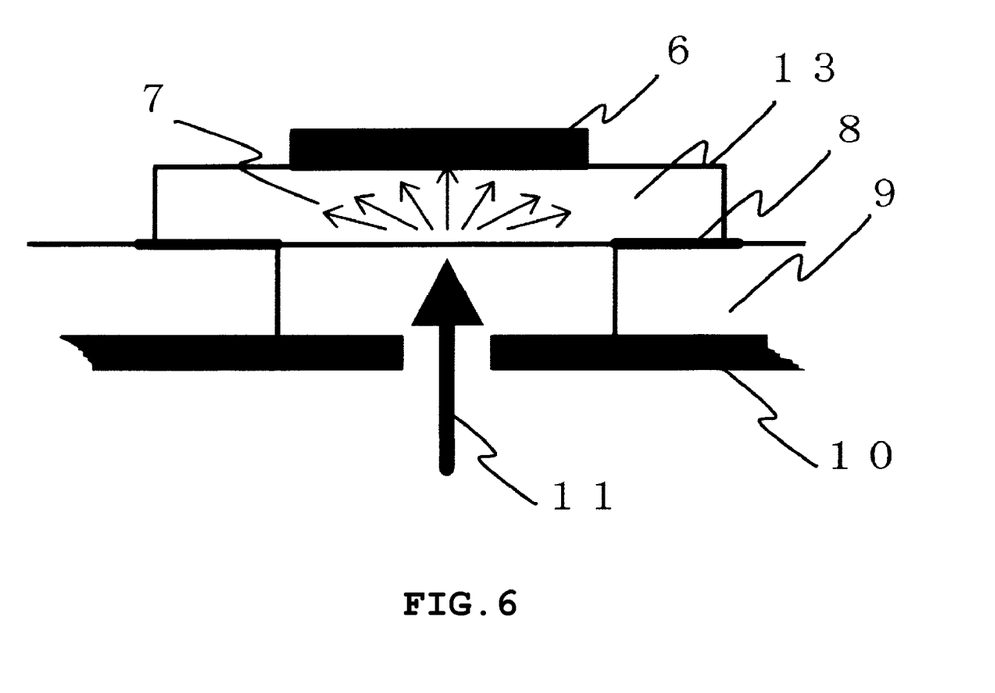
FIG. 6 is a sectional view of an example phonon-mediated radiation detector of the related art.

In FIG. 6, which is a sectional view of an example radiation detector formed of a radiation absorber and phonon sensor of the related art, 6 represents a phonon sensor such as a superconducting series junction or kinetic inductance detector, 13 represents a single-crystal silicon substrate in which recombination centers are not introduced, and 11 represents radiation.

The Examples below show differences in the detection performance achieved with the superconducting series-junction detector of the first Example of the invention of the present application in FIG. 5 and the superconducting series-junction detector of the related art in FIG. 6. Both detectors were fabricated under identical conditions, apart from the introduction of impurities into the substrate.

Example 1

In the superconducting series-junction detector of the first Example of the present invention corresponding to FIG. 5, the radiation absorber was a silicon substrate with a thickness of about 0.4 mm, and the resistivity of the silicon substrate before introducing the impurities was about 100 Ωcm. Before fabricating the superconducting series junction on the surface thereof, Au serving as the impurity forming a deep level was introduced into the substrate.

Figure 7:
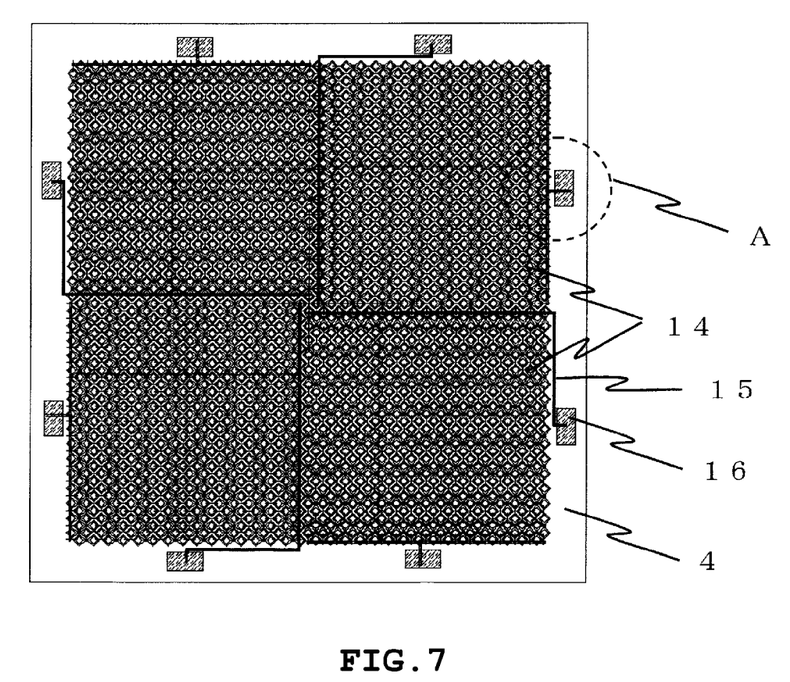
FIG. 7 is a plan view of a superconducting series-junction detector
Figure 8:
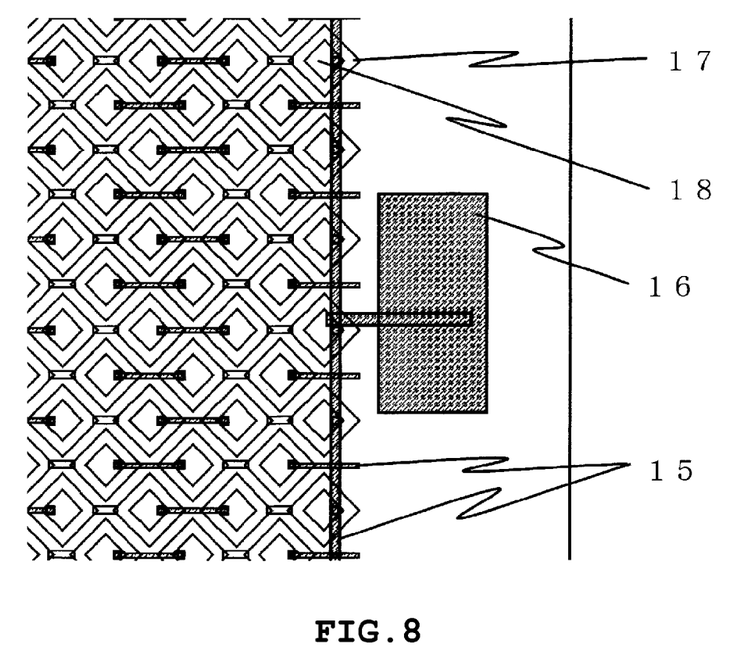
FIG. 8 is an enlarged view of part A in FIG. 7.

On the surface at one side of the silicon substrate, both surfaces of which were polished, a film of gold was formed by sputtering, and after this film formation, the Au was thermally diffused into the substrate by heating the substrate to approximately 900° C. After the heat treatment, the gold remaining on the surface was removed. On the surface of the silicon substrate on the opposite side from where the gold film was formed, a superconducting series junction was fabricated so that the size of each detector was about 3 mm×3 mm. After fabricating the superconducting series junction, the substrate was diced to form multiple detectors with areas of about 3 mm×3 mm. A plan view of the superconducting series-junction detector is shown in FIG. 7. FIG. 8 shows an enlarged view of part A in FIG. 7. 4 represents the substrate, 14 represents the superconducting series junction, 15 represents an upper wiring line, 16 represents a bonding pad, 17 represents a superconducting lower electrode of a superconducting tunnel junction, and 18 represents a superconducting upper electrode.

As for the radiation, when X-rays of about 5.9 keV emitted from the radioisotope $^{55}Fe$ were measured, with the superconducting series-junction detector of the invention of the present application shown in FIG. 5, a resolution of about 104 eV was obtained, which is better than the best resolution of about 125 eV for semiconductor detectors until now. On the other hand, with the detector of the related art shown in FIG. 6, the energy resolution was about 166 eV.

As a result, it became clear that, naturally, the energy expended in creating electron-hole pairs can be released in the form of phonons by introducing recombination centers, and also that, of the phonons released by the recombination, a considerably high percentage of the phonons have energy larger than the size of the energy gap of a superconductor, and that the phonons released by electron-hole recombination efficiently contribute to the signal. This is something that was unknown from the related art, and the invention of the present application was conceived based on this discovery.

Example 2

When visible light with a wavelength of about 0.8 μm was radiated onto the rear face of the substrate of a detector having the same construction as Example 1, at the opposite side from the face where the superconducting series junction was formed, with a detector element of the present patent application shown in FIG. 5, a signal about 1.3 times larger than that of the detector element of the related art shown in FIG. 6 was obtained. In addition, the speed was about two times higher.

INDUSTRIAL APPLICABILITY

A radiation detector with high energy resolution or high sensitivity is an important measurement means for various kinds of analytical equipment and scientific measurement using radiation.

EXPLANATION OF REFERENCE SINGS

1 superconducting film through-line
2 superconducting film for phonon absorption
3 high-Q-factor superconducting resonator line
4 semiconducting or insulating radiation-absorber single-crystal substrate
5 substrate for high-Q-factor superconducting resonator line
6 phonon sensor
7 phonon
8 adhesive
9 cooled copper plate
10 collimator
11 radiation
12 single-crystal substrate in which recombination centers are introduced
13 single-crystal substrate in which recombination centers are not introduced
14 superconducting series junction
15 upper wiring line
16 bonding pad
17 superconducting lower electrode
18 superconducting upper electrode

What is claimed is:

1. A radiation detector in which a semiconductor or insulator single crystal serves as a radiation absorber, and which is provided with a phonon sensor bonded to a surface of the absorber, wherein the radiation detector uses an absorber into which recombination centers are introduced so that the average lifetime of an electron-hole pair generated in the absorber by radiation is 20 μs or less.

2. A radiation detector according to claim 1, using an absorber into which the recombination centers are introduced so that the average lifetime of an electron-hole pair generated in the absorber by radiation is 2 μs or less.

3. A radiation detector according to claim 1, wherein the recombination centers are an impurity element that forms a deep energy level in a 60% energy region at the center of an energy gap.

4. A radiation detector according to claim 1, wherein the recombination centers are crystal defects introduced by radiating radiation such as charged particles, gamma rays, or neutrons.

5. A radiation detector according to claim 1, wherein the phonon sensor is a superconducting series junction formed of a plurality of superconducting tunnel junctions.

6. A radiation detector according to claim 1, wherein the phonon sensor is a kinetic inductance detector.

7. A radiation detector according to claim 1, wherein the recombination centers are an impurity element forming a deep energy level in a 60% energy region at the center of an energy gap, and the phonon sensor is a superconducting series junction formed of a plurality of superconducting tunnel junctions.

8. A radiation detector according to claim 1, wherein the recombination centers are crystal defects introduced by radiating radiation such as charged particles, gamma rays, or neutrons, and the phonon sensor is a superconducting series junction formed of a plurality of superconducting tunnel junctions.

9. A radiation detector according to claim 1, wherein the recombination centers are an impurity element forming a deep energy level in a 60% energy region at the center of an energy gap, and the phonon sensor is a kinetic inductance detector.

10. A radiation detector according to claim 1, wherein the recombination centers are crystal defects introduced by radiating radiation such as charged particles, gamma rays, or neutrons, and the phonon sensor is a kinetic inductance detector.

11. A radiation detector in which a semiconductor or insulator single crystal serves as a radiation absorber, and which is provided with a phonon sensor bonded to a surface of the absorber, wherein the radiation detector uses an absorber into which recombination centers are introduced so that the maximum density of the recombination centers is from $1\times10^{12}$/$cm^3$ or more to $1\times10^{21}$/$cm^3$ or less.

12. A radiation detector according to claim 11, using an absorber in which the electron-hole recombination centers are introduced so that the maximum density is from $1\times10^{13}$/$cm^3$ or more to $1\times10^{20}$/$cm^3$ or less.

13. A radiation detector according to claim 11, wherein the recombination centers are an impurity element forming a deep energy level in a 60% energy region at the center of an energy gap.

14. A radiation detector according to claim 11, wherein the recombination centers are crystal defects introduced by radiating radiation such as charged particles, gamma rays, or neutrons.

15. A radiation detector according to claim 11, wherein the phonon sensor is a superconducting series junction formed of a plurality of superconducting tunnel junctions.

16. A radiation detector according to claim 11, wherein the phonon sensor is a kinetic inductance detector.

17. A radiation detector according to claim 11, wherein the recombination centers are an impurity element forming a deep energy level in a 60% energy region at the center of an energy gap, and the phonon sensor is a superconducting series junction formed of a plurality of superconducting tunnel junctions.

18. A radiation detector according to claim 11, wherein the recombination centers are crystal defects introduced by radiating radiation such as charged particles, gamma rays, or neutrons, and the phonon sensor is a superconducting series junction formed of a plurality of superconducting tunnel junctions.

19. A radiation detector according to claim 11, wherein the recombination centers are an impurity element forming a deep energy level in a 60% energy region at the center of an energy gap, and the phonon sensor is a kinetic inductance detector.

20. A radiation detector according to claim 11, wherein the recombination centers are crystal defects introduced by radiating radiation such as charged particles, gamma rays, or neutrons, and the phonon sensor is a kinetic inductance detector.

* * * * *